United States Patent [19]
Landi

[11] 3,773,139
[45] Nov. 20, 1973

[54] AUTOMOBILE THEFT PREVENTION LOCK
[76] Inventor: Anthony O. Landi, 1225 W. 30th St., Erie, Pa. 16508
[22] Filed: Aug. 11, 1971
[21] Appl. No.: 170,902

[52] U.S. Cl. .................... 180/114, 137/382, 70/242
[51] Int. Cl. ............................................ B60r 25/00
[58] Field of Search ................... 180/114; 70/242, 70/243, 244; 137/383, 384.6, 382, 382.5; 123/198 B, 198 DB; 251/294, 214, 114

[56] References Cited
UNITED STATES PATENTS

| | | | |
|---|---|---|---|
| 968,039 | 8/1910 | Farley | 251/214 |
| 1,246,772 | 11/1917 | Morris | 137/382 |
| 1,251,806 | 1/1918 | Miller | 137/382 |
| 1,290,064 | 1/1919 | Brown | 137/382 |
| 1,346,480 | 7/1920 | Bird | 137/384.6 |
| 3,308,850 | 3/1967 | Gill | 251/294 X |

FOREIGN PATENTS OR APPLICATIONS 15,584   3/1901   Great Britain ..................... 251/114

*Primary Examiner*—Kenneth H. Betts
*Assistant Examiner*—John M. McCormack
*Attorney*—Charles L. Lovercheck

[57] ABSTRACT

The specification discloses an automobile theft prevention lock which will shut off and lock the fuel supply, prevent access to the carburetor, and thereby prevent theft. The device has a lock compartment and a valve in the compartment, which will shut off the fuel supply when actuated from within the passenger compartment. The hood of the automobile must then be raised, and the proper key inserted to open the compartment and reset the valve before the automobile fuel can reach the carburetor and thus the automobile can be operated.

2 Claims, 4 Drawing Figures

AUTOMOBILE THEFT PREVENTION LOCK

OBJECTS OF THE INVENTION

It is an object of the invention to provide an improved automobile safety device.

Another object of the invention is to provide a safety device made up of a valve in a lock compartment under the hood of the automobile in series with the carburetor and fuel supply, which will interrupt the fuel supply when set and thereby prevent theft.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

GENERAL DESCRIPTION OF THE DRAWINGS

Figures 1, 2:
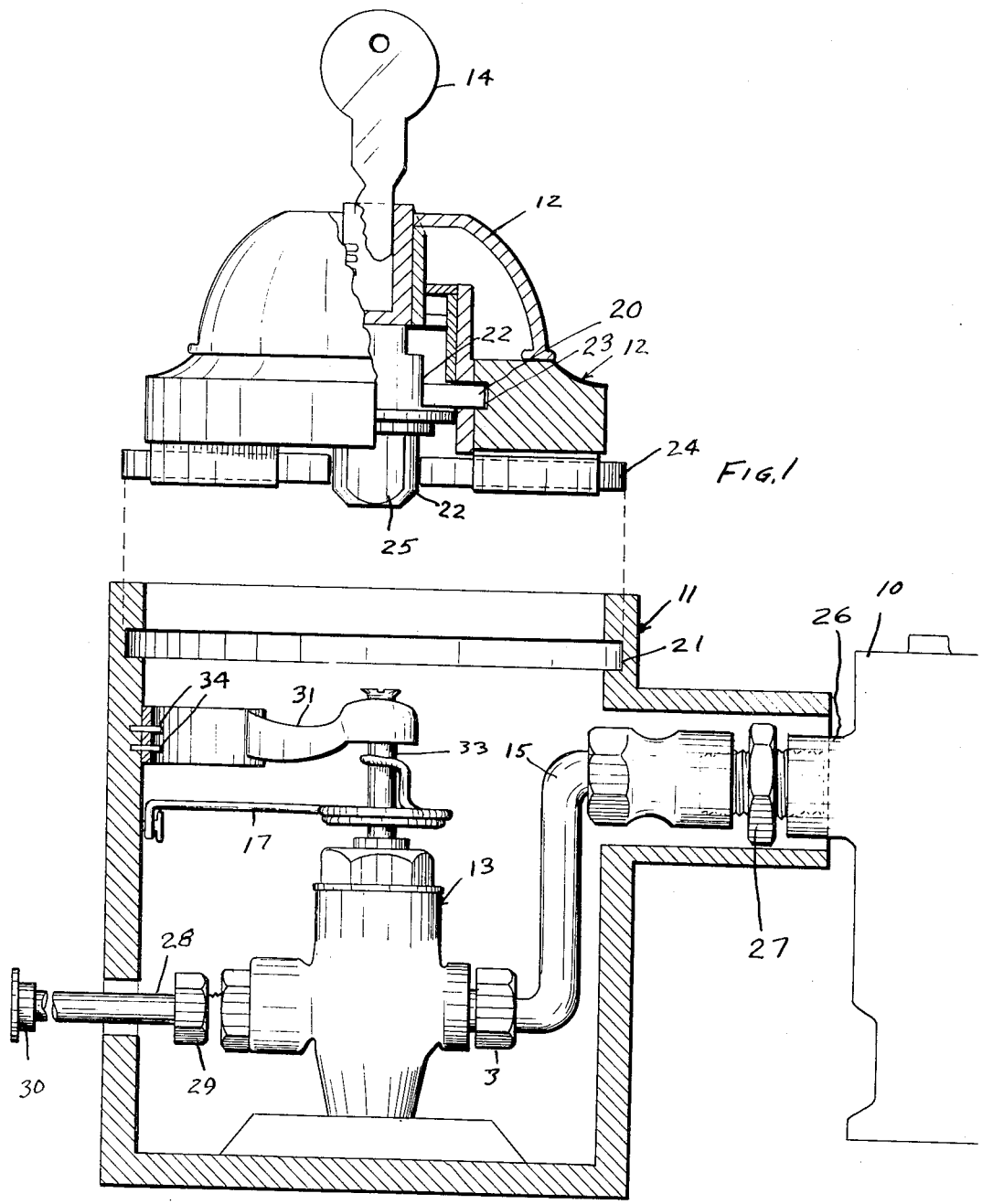
FIG. 1 is a top view of the device according to the invention.
FIG. 2 is a longitudinal cross sectional view of the body and valve of the device according to the invention.
Figure 3:
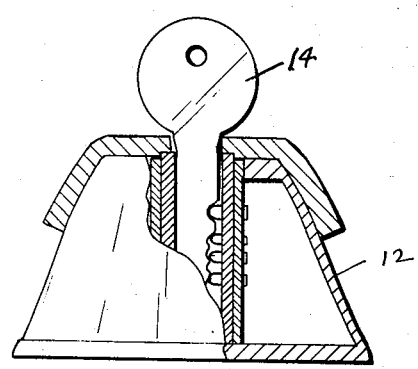
FIG. 3 is a view partly in cross section of the lock part of the device according to the invention.

The device according to the invention is adapted to be attached to the carburetor body intake 10 of a vehicle in series with the fuel line 15. The device is made up of a conventional gas tank type of lock 12, a valve housing 11, and a valve 13 in the housing. The gas tank lock has a suitable key 14 for moving the cams 20 out of the groove 21 so that the entire lock assembly can be removed from the housing 11. It will be seen that when the key is rotated, the cam 22 moves the bolt 20 into groove 23 and stops the cam 22 from further rotation. At this point, the bolts 24 will be forced outward into the groove 21, so that the cap cannot be removed until the bolts 24 are withdrawn. The cap will preferably have two diametrically disposed bolts 24, each of which may be extended or retracted.

When the key is rotated to move the bolts 20 out of the lock body 12, the cam 22 can then be rotated so that the bolts 24 rest on the flat 25. These bolts will thus move inwardly out of the groove 21, so that the lock body 12 can be lifted out of the body 11 to give access to the valve 10 inside the body 11.

The lock body 11 has a boss 26 which will abut up snugly against the carburetor body 10 and close the fuel connection 27. The fuel line is cut, and the valve 13 is inserted between the parts 15 and 28 of the fuel line by suitable fittings 29 and 30. The part 28 of the fuel line leads to the fuel tank or fuel supply indicated at 30.

Figure 4:
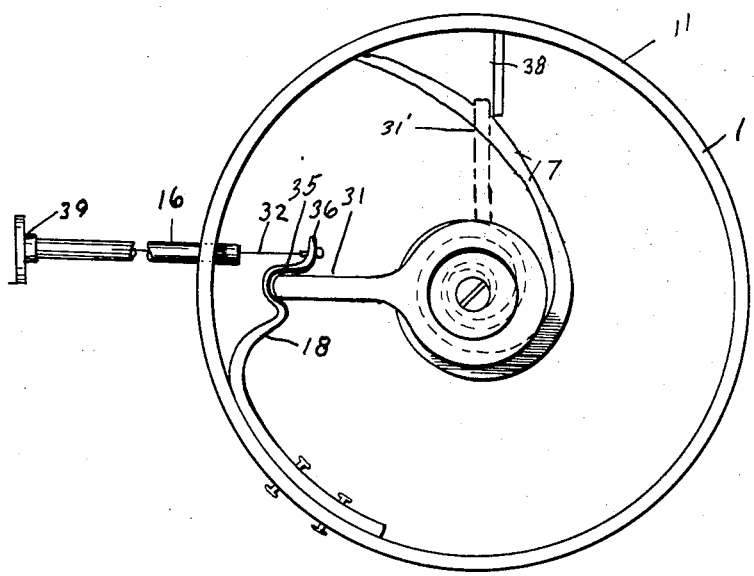
FIG. 4 is a top view of FIG. 2.

The valve 13 is spring loaded so that when in a set in the position indicated in FIG. 4 and in FIG. 2, the flow of fuel through the line 28 and 15 is not interrupted and fuel can flow to the carburetor. When the handle 31 is released by a tension on the Boden wire 32, which will pull the trigger spring 18 outward toward the inner periphery of the housing 11, the spiral spring 17 will turn the stem of the valve to closed position.

The spring 18 is a flat leaf spring that is fixed to the inner periphery of the body 11 by fasteners 34, and it has a pocket 35 that receives the outer end of the handle 31.

The Boden wire 32 can be actuated from within the passenger compartment of the automobile, and it acts through its housing 16 to pull the end 26 of the spring away from the handle 31, thereby allowing the spiral wire 17 to rotate the valve stem 33 ninety degrees into engagement with the stop 38 in the dashed line position of 31'.

The valve 13 may be of a conventional plug valve type. When installed in a vehicle, the body 11 will be supported on the carburetor of a motor vehicle with the boss 26 covering the fuel intake to the carburetor. The valve 13 will be inserted in series with the fuel line 15 and 28. The Boden wire 16 will be installed with the actuating member 39 in the passenger compartment. When the automobile is to be left unattended in a place where the probability of theft is high, the operator will pull the button 39 to allow the lever 31 to swing into engagement with the stop 38, thereby interrupting the flow of fuel through the line 28. Therefore, to start the vehicle, it will be necessary to have access to valve 11. To do this, one must have a key 15 to remove the cap 12 and manually reset the valve 13 from within before body 11 can be started in the usual manner.

I claim:

1. A theft prevention device for a vehicle having a fuel supply and a carburetor comprising
   a valve housing adapted to be disposed adjacent the carburetor having a boss integrally attached to one side thereof,
   said boss comprising a fuel line inlet to said carburetor,
   said housing receiving said boss on said carburetor,
   and said housing being disposed closely adjacent said carburetor whereby the fuel connection to said carburetor is inaccessible to unauthorized persons from outside said housing,
   a valve in said housing,
   a removable closure for closing the compartment with said valve therein,
   said valve being adapted to be connected in fluid flow relation with the fuel supply of said vehicle and through said boss on said carburetor,
   and means disposed outside said housing to move said valve to closed position,
   and means inside said housing accessible when said closure is removed to move said valve to open position whereby said vehicle can be operated,
   said valve is a rotary valve with a stem and releasable means to hold said valve in open position,
   spring means to urge said valve to closed position,
   and means accessible from outside said compartment to release said releasable means.

2. The device recited in claim 1 wherein said spring is a spiral spring fixed to the inner periphery of said body.

* * * * *